United States Patent
Suzuki et al.

(10) Patent No.: US 9,360,071 B2
(45) Date of Patent: Jun. 7, 2016

(54) CALIPER BRAKE APPARATUS

(71) Applicant: KAYABA INDUSTRY CO., LTD., Minato-ku, Tokyo (JP)

(72) Inventors: Tsutomu Suzuki, Kanagawa (JP); Yoshiyuki Ookawara, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/362,148

(22) PCT Filed: Nov. 29, 2012

(86) PCT No.: PCT/JP2012/080890
§ 371 (c)(1),
(2) Date: Jun. 2, 2014

(87) PCT Pub. No.: WO2013/118375
PCT Pub. Date: Aug. 15, 2013

(65) Prior Publication Data
US 2014/0299423 A1    Oct. 9, 2014

(30) Foreign Application Priority Data

Dec. 6, 2012    (JP) ................................. 2012-022693

(51) Int. Cl.
*F16D 65/84*    (2006.01)
*B61H 5/00*    (2006.01)
*F16D 65/18*    (2006.01)
*F16D 65/00*    (2006.01)
(Continued)

(52) U.S. Cl.
CPC *F16D 65/84* (2013.01); *B61H 5/00* (2013.01); *F16D 55/227* (2013.01); *F16D 65/0068* (2013.01); *F16D 65/18* (2013.01); *F16D 65/0971* (2013.01); *F16D 2065/785* (2013.01); *F16D 2121/08* (2013.01); *F16D 2125/06* (2013.01)

(58) Field of Classification Search
CPC ............ F16D 2121/02; F16D 2121/04; F16D 2121/08; F16D 2125/12; F16D 65/18; F16D 65/84; F16D 65/0068; B61H 5/00
See application file for complete search history.

(56) References Cited

U.S. PATENT DOCUMENTS

2009/0000893 A1    1/2009    Denys
2010/0025166 A1 *  2/2010    Suzuki et al. .............. 188/73.31
(Continued)

FOREIGN PATENT DOCUMENTS

| JP | 2009-115214 A | 5/2009 |
|----|---------------|--------|
| JP | 2010-7688 A   | 1/2010 |
| JP | 2011-236958 A | 11/2011 |

OTHER PUBLICATIONS

International Search Report mailed Dec. 25, 2012, in corresponding International Application No. PCT/JP2012/080890.

*Primary Examiner* — Vishal Sahni
(74) *Attorney, Agent, or Firm* — Hauptman Ham, LLP

(57) ABSTRACT

A caliper brake apparatus includes a brake lining that advances/retreats relative to a caliper main body supported on a vehicle body and can apply a frictional force by slidingly contacting a disc, an anchor pin that supports a guide plate supporting the brake lining on the caliper main body such that it can freely advance/retreat, a piston that advances/retreats relative to the caliper main body and can press the brake lining via the guide plate, a diaphragm that abuts a rear surface of the piston and defines a pressure chamber within the caliper main body and elastically deforms due to pressure of compressed air within the pressure chamber so as to move the piston, and a piston plate that supports the piston on the anchor pin such that the piston can freely slide. The piston includes a plurality of thermal insulation members whose distal ends protrude toward the guide plate.

12 Claims, 8 Drawing Sheets

(51) Int. Cl.
*F16D 55/227* (2006.01)
*F16D 65/78* (2006.01)
*F16D 121/08* (2012.01)
*F16D 125/06* (2012.01)
*F16D 65/097* (2006.01)

(56) References Cited

U.S. PATENT DOCUMENTS

2010/0044167 A1* 2/2010 Suzuki et al. ............... 188/72.3
2011/0233009 A1* 9/2011 Suzuki et al. ............... 188/72.4

* cited by examiner

US 9,360,071 B2

CALIPER BRAKE APPARATUS

RELATED APPLICATIONS

The present application is a National Phase of International Application Number PCT/JP2012/080890, filed Nov. 29, 2012, which claims priority to Japanese Application Number 2012-022693, filed Feb. 6, 2012.

TECHNICAL FIELD

The present invention relates to a caliper brake apparatus that applies frictional force to a disc that rotates together with a wheel to brake the rotation of the wheel.

BACKGROUND ART

Conventionally, in a vehicle such as a rail car, a hydrostatic pressure brake apparatus that performs braking by utilizing hydrostatic pressure such as hydraulic or pneumatic pressure has been used. JP2011-236958A discloses a caliper brake apparatus in which a piston that advances/retreats due to deformation of a pressing elastic film in accordance with changes in fluid pressure presses a brake lining against a disc.

SUMMARY OF INVENTION

However, in the caliper brake apparatus disclosed in JP2011-236958A, the piston is fastened by a plurality of bolts to a guide plate to which the brake lining is attached. Thus, frictional heat generated by contact between the brake lining and the disc may be transferred from the guide plate to the pressing elastic film via the piston.

The present invention was created in consideration of the above-described problem, and an object thereof is to improve the thermal insulation of frictional heat generated by contact between the brake lining and the disc.

According to one aspect of this invention, a caliper brake apparatus that is configured to sandwich a disc which rotates together with a wheel to apply a frictional force thereto, includes: a caliper main body that is supported on a vehicle body, a brake lining that is configured to advance/retreat relative to the caliper main body and can apply a frictional force by slidingly contacting the disc, a guide plate that supports the brake lining, an anchor pin that supports the guide plate on the caliper main body such that it can freely advance/retreat, a piston that is configured to advances/retreats relative to the caliper main body and can press against the brake lining via the guide plate, an elastic film that abuts a rear surface of the piston and defines a pressure chamber within the caliper main body and elastically deforms due to pressure of a working fluid within the pressure chamber so as to move the piston, and a piston plate that supports the piston on the anchor pin such that the piston can freely slide. The piston includes a plurality of small pistons provided such that their distal ends protrude toward the guide plate.

The details as well as other features and advantages of this invention are set forth in the remainder of the specification and are shown in the accompanying drawings.

DESCRIPTION OF EMBODIMENTS

Figure 1:
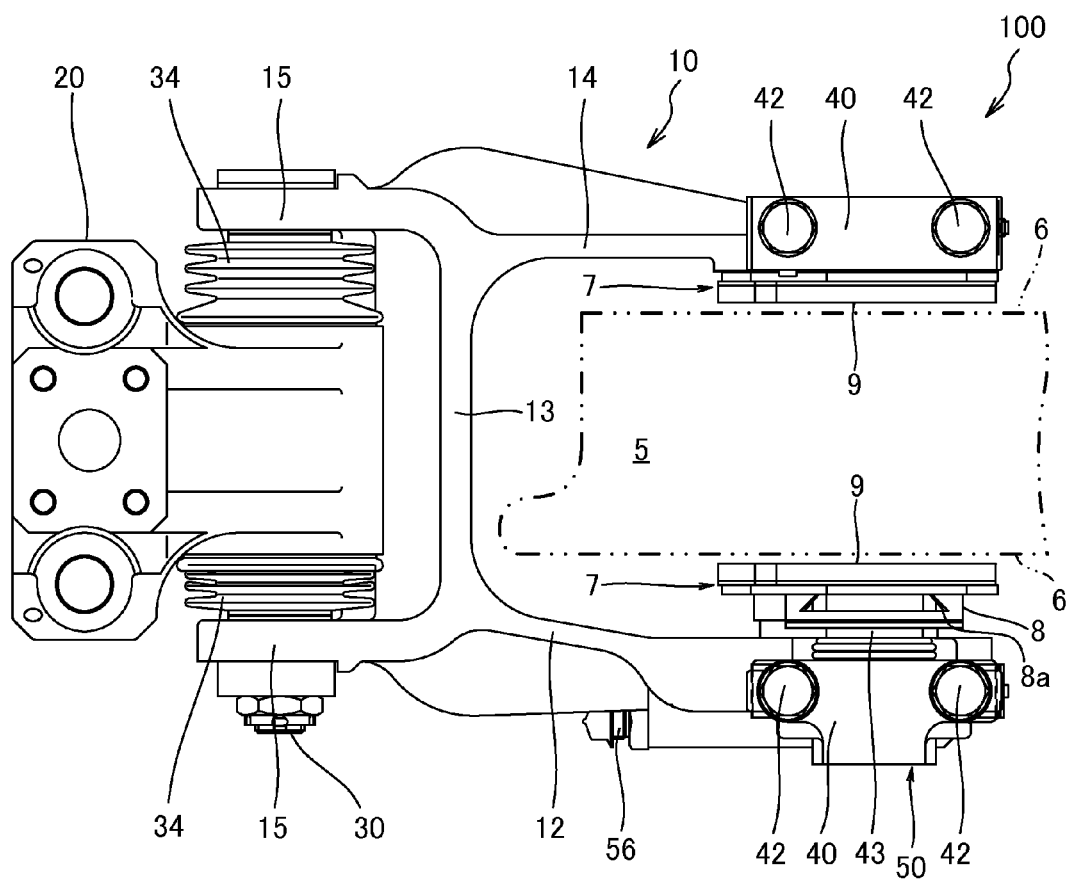
FIG. 1 is a plan view of a caliper brake apparatus according to an embodiment of the present invention.

A caliper brake apparatus 100 according to an embodiment of the present invention will now be explained below referring to the drawings.

First, referring to FIGS. 1 and 2, the overall constitution of the caliper brake apparatus 100 will be explained.

The caliper brake apparatus 100 is a pneumatic brake for a rail car in which compressed air is used as the working fluid. The caliper brake apparatus 100 includes a caliper main body 10 that is supported on a bogie (vehicle body) (not illustrated) via a support frame 20, a pair of brake linings 7 that can apply frictional force by advancing/retreating relative to the caliper main body 10 to slidingly contact a disc 6, a guide plate 8 that supports a brake lining 7, a pair of anchor pins 43 that support the guide plate 8 on the caliper main body 10 such that it can freely advance/retreat, and a pressing mechanism 50 that presses the brake lining 7 against the disc 6 by pressure of compressed air.

The caliper brake apparatus 100 sandwiches the disc 6 which rotates together with a wheel 5 to apply a frictional force thereto. Specifically, the caliper brake apparatus 100 grips the disc 6 from both surfaces thereof with the pair of brake linings 7 to brake the rotation of the wheel 5 by the frictional force between the disc 6 and the brake linings 7.

The disc 6 is formed on the front and back surfaces of the wheel 5 and rotates integrally with the wheel 5. Instead of a constitution in which the disc 6 is formed integrally with the wheel 5, a separate disc 6 that rotates together with the wheel 5 can be provided.

As shown in FIG. 1, the caliper main body 10 includes a first caliper arm 12 and a second caliper arm 14 that extend so as to straddle the disc 6, a yolk 13 that connects the first caliper arm 12 and the second caliper arm 14, and a pair of brackets 15 for supporting the caliper main body 10 on the bogie.

Figure 2:
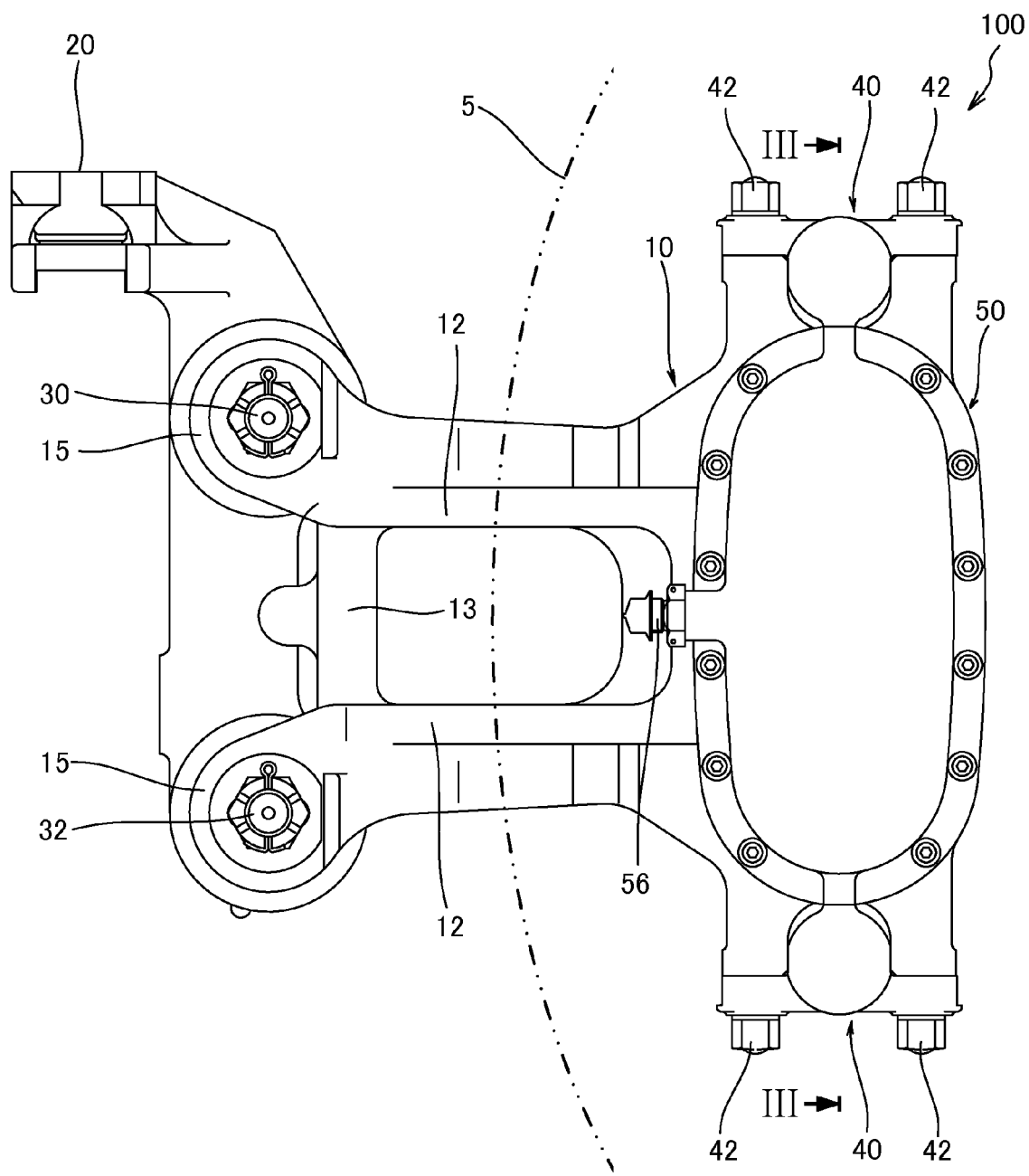
FIG. 2 is a front view of FIG. 1.

As shown in FIG. 2, the caliper main body 10 is floatingly supported such that it can slide relative to the support frame 20 by an upper slide pin 30 and a lower slide pin 32. Thereby, the caliper main body 10 follows the relative movement in the axial direction of the wheel 5 relative to the bogie, and the brake linings 7 oppose the disc 6 of the wheel 5 in parallel.

The upper slide pin 30 and the lower slide pin 32 are provided so as to penetrate the support frame 20. Both ends of the upper slide pin 30 and the lower slide pin 32 are respectively connected to the brackets 15 of the caliper main body 10. The caliper main body 10 is supported on the support frame 20 so as to enable relative movement in the axial direction of the upper slide pin 30 and the lower slide pin 32. As shown in FIG. 1, the exposed parts of the upper slide pin 30 and the lower slide pin 32 are covered by rubber boots 34 so that they are protected from dust and the like.

The brake linings 7 receive a pressing force generated by the pressing mechanism 50 and are pressed to abut the disc 6 in parallel. The brake linings 7 each have a brake block 9 that abuts the disc 6 which rotates together with the wheel 5. A rear surface that is opposite to the surface of the brake lining 7 on which the brake block 9 is provided is fixed to the guide plate 8. The brake linings 7 brake the rotation of the wheel 5 by the frictional force generated by contact between the brake blocks 9 and the disc 6.

The guide plate 8 has a dovetail groove 8a that is formed along the lengthwise direction and in which the rear surface of the brake lining 7 engages. Both ends in the lengthwise direction of the guide plate 8 are supported on the caliper main body 10 by the pair of anchor pins 43. Adjusters 40 which include the anchor pins 43 will be explained in detail below with reference to FIG. 3.

Next, the internal structure of the caliper main body 10 will be explained referring to FIGS. 3, 4A, and 4B.

Figure 3:
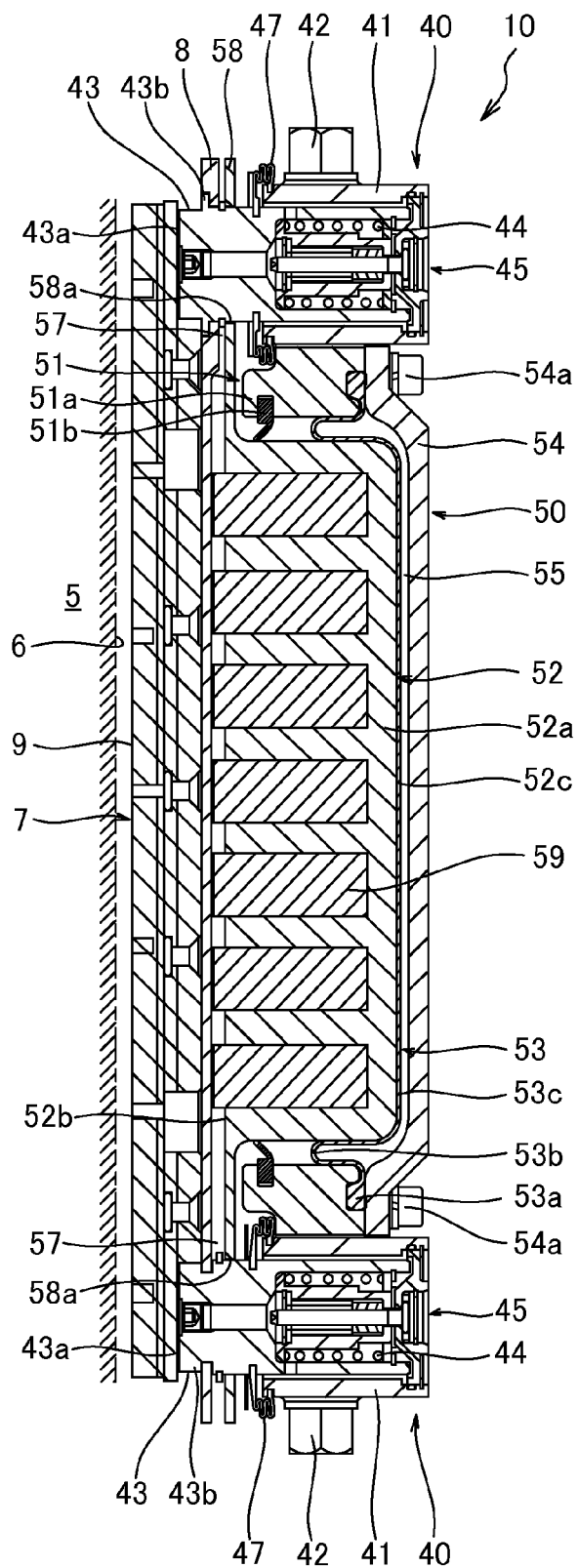
FIG. 3 is a cross-section view along line III-III in FIG. 2.

As shown in FIG. 3, the caliper main body 10 is provided with a pair of adjusters 40 arranged on both ends in the lengthwise direction and the pressing mechanism 50 arranged between the pair of adjusters 40.

The adjusters 40 adjust the initial position of the brake lining 7 relative to the disc 6. The adjusters 40 are respectively fastened to the top and bottom ends of the caliper main body 10 by the anchor bolts 42.

The adjusters 40 each include a brake lining receiver 41 fixed to the caliper main body 10 by the anchor bolt 42, an anchor pin 43 that is provided such that it can advance/retreat relative to the brake lining receiver 41 and supports the brake lining 7 on the caliper main body 10, a return spring 44 that biases the brake lining 7 in a direction away from the disc 6, and a gap adjustment mechanism 45 that adjusts the gap between the brake lining 7 and the disc 6 to a fixed amount when releasing the braking.

The anchor pins 43 are formed in an approximately closed-end cylindrical shape. The anchor pins 43 are provided in a pair so as to support both ends of the brake lining 7. The anchor pins 43 each have a collar part 43b that engages with the guide plate 8. The anchor pins 43 are each provided such that a bottom part 43a protrudes from the brake lining receiver 41, and support the brake lining 7 by fitting the collar parts 43b into both ends of the guide plate 8.

When the brake lining 7 approaches the disc 6, the anchor pins 43 are withdrawn from the brake lining receivers 41 by the guide plate 8 that displaces together with the brake lining 7 so as to become displaced in the axial direction. During braking in which the brake lining 7 slidingly contacts the disc 6, the anchor pins 43 support the brake lining 7 so as to counteract the disc 6 which is attempting to move the brake lining 7 in the circumferential direction by frictional force.

On the inner periphery of each anchor pin 43, the return spring 44 and the gap adjustment mechanism 45 are mounted. A sliding part that is exposed to the outside during sliding in each anchor pin 43 is covered by a rubber boot 47 so that it is protected from dust and the like.

Each return spring 44 is a coil spring that is compressed and interposed in the inner periphery of each anchor pin 43. When changing from a braking state to a non-braking state, the collar part 43b of the anchor pin 43 pushes back the brake lining 7 via the guide plate 8 by the biasing force of the return spring 44 so as to separate the brake lining 7 from the disc 6 by a predetermined distance. Thereby, the distance between the brake lining 7 and the disc 6 when releasing the braking can be adjusted and the heat dissipation of the disc 6 can be improved.

The gap adjustment mechanisms 45 make adjustments such that the amount by which the brake lining 7 is returned by the biasing force of the return springs 44 when releasing the braking is always constant. In other words, the gap adjustment mechanisms 45 maintain the interval between the brake lining 7 and the disc 6 such that it is always constant when releasing the braking.

The pressing mechanism 50 includes a cylinder 51 formed on the caliper main body 10, a piston 52 that advances/retreats relative to the cylinder 51 and can press the brake lining 7 via the guide plate 8, a diaphragm 53 that abuts a rear surface 52c of the piston 52 and defines a pressure chamber 55 within the caliper main body 10 and serves as an elastic film that elastically deforms due to pressure of compressed air within the pressure chamber 55 so as to move the piston 52, and a piston plate 58 that supports the piston 52 on the anchor pins 43 such that the piston 52 can freely slide.

The pressing mechanism 50 deforms the diaphragm 53 by adjusting the air pressure in the pressure chamber 55, and causes the piston 52 to advance/retreat relative to the cylinder 51 by deforming the diaphragm 53. The pressing mechanism 50 presses the brake lining 7 against the disc 6 via the guide plate 8 by causing the piston 52 to retreat from the cylinder 51.

The cylinder 51 includes a cylinder main body 51a whose inner periphery the piston 52 advances toward/retreats from, and a caliper cover 54 that sandwiches the diaphragm 53 between itself and the cylinder main body 51a to fix it and blocks the rear surface of the cylinder main body 51a to define the pressure chamber 55.

The cylinder main body 51a is formed in an oval cylinder shape so as to surround the periphery of the piston 52 in an annular shape. On the inner periphery of the cylinder main body 51a, a dust seal 51b is provided to slidingly contact the outer peripheral surface of the piston 52 and protect it from dust and the like.

The caliper cover 54 is a plate member that is formed in an oval shape corresponding to the cylinder main body 51a. The caliper cover 54 is fixed to the end surface of the cylinder main body 51a with a plurality of bolts 54a.

The diaphragm 53 elastically deforms by the pressure within the pressure chamber 55 to move the piston 52. The diaphragm 53 includes a peripheral edge part 53a that forms the outermost periphery, a pressing part 53c that is formed on the innermost periphery, and a bellows part 53b that is formed continuously between the peripheral edge part 53a and the pressing part 53c.

The peripheral edge part 53a is sandwiched and fixed between the cylinder main body 51a and the caliper cover 54. At this time, the peripheral edge part 53a serves as packing, and thus the air tightness of the pressure chamber 55 is secured.

The bellows part 53b is positioned between the inner peripheral surface of the cylinder main body 51a and the outer peripheral surface of the piston 52. The bellows part 53b extends from a folded state (the state in FIG. 3) when the pressure in the pressure chamber 55 rises, and returns to a folded state when the pressure in the pressure chamber 55 drops. In other words, the bellows part 53b can deform between a folded state and an extended state by the air pressure that is supplied to the pressure chamber 55.

The pressing part 53c abuts the piston 52, and is displaced in the retreating direction of the piston 52 by the extension of the bellows part 53b which was folded. The piston 52 is pressed by the displacement of the pressing part 53c and moves within the cylinder 51.

The pressure chamber 55 is defined by the diaphragm 53 and the caliper cover 54 inside the cylinder 51. The pressure chamber 55 causes the piston 52 to advance/retreat in accordance with the expansion/contraction of the volume of the pressure chamber 55. A through-hole 56 (refer to FIG. 2) is provided on the pressure chamber 55. Condensed air for deforming the diaphragm 53 during braking is supplied through the through-hole 56 from an external air pressure source.

The piston 52 abuts the rear surface of the guide plate 8. The piston 52 is retained within the cylinder 51 by the diaphragm 53.

Figure 4A:
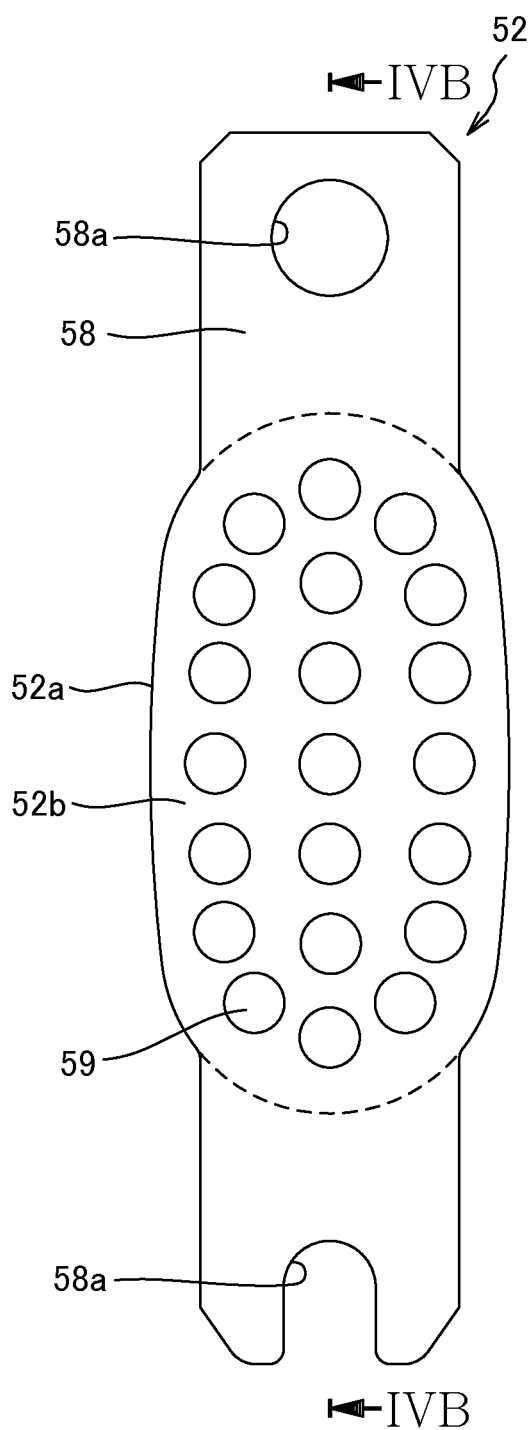
FIG. 4A is a front view of a piston and a piston plate.
Figure 4B:
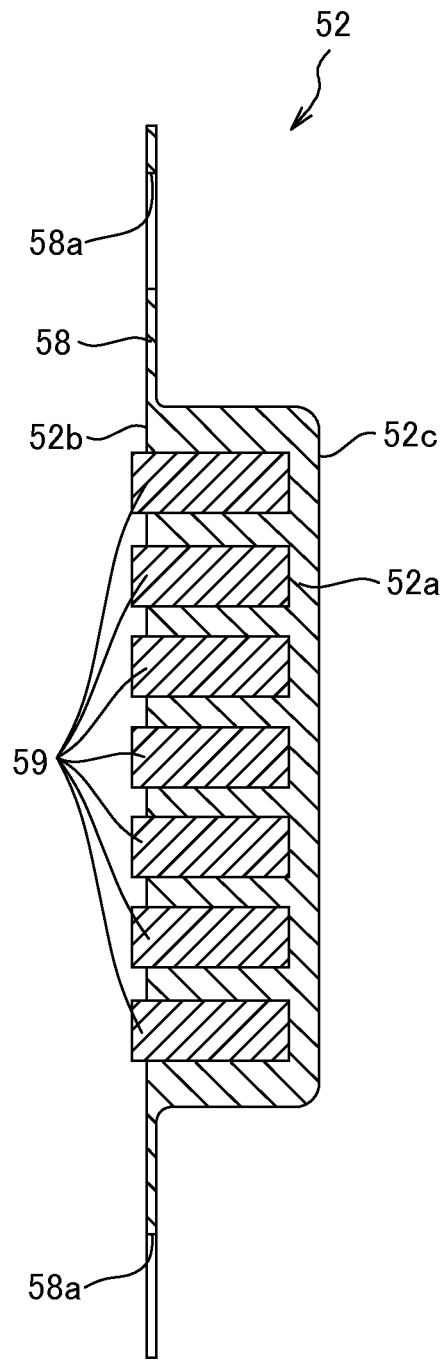
FIG. 4B is a cross-section view along line IVB-IVB in FIG. 4A.

As shown in FIGS. 4A and 4B, the piston 52 includes a piston main body 52a that is formed in an elliptical shape, and thermal insulation members 59 consisting of a plurality of small pistons that are provided such that their distal ends protrude from a front surface 52b toward the guide plate 8.

The piston main body 52a includes the front surface 52b that faces the guide plate 8 and the rear surface 52c that is formed on the opposite side of the front surface 52b and abuts the diaphragm 53. The piston main body 52a is formed integrally with and supported on the piston plate 58.

The piston 52 advances/retreats within the cylinder 51 by the deformation of the diaphragm 53 that abuts the rear surface 52c of the piston main body 52a. In this way, the diaphragm 53 presses against the entire surface of the rear surface 52c that is formed in an elliptical shape, and thus the pressing efficiency can be improved compared to a case in which the thermal insulation members 59 are directly pressed.

The thermal insulation members 59 suppress the transfer of frictional heat generated by contact between the brake lining 7 and the disc 6 to the diaphragm 53 via the piston main body 52a. In the present embodiment, 21 thermal insulation members 59 are provided.

Each thermal insulation member 59 is formed in a cylindrical shape, and its base part is embedded and fixed in the piston main body 52a. Instead of embedding the thermal insulation members 59 into the piston main body 52a, they can also be fixed by attaching them to the front surface 52b of the piston main body 52a or the like. By fixing the thermal insulation members 59 to the piston main body 52a, the thermal insulation members 59 do not tilt when pressed, and thus the pressing efficiency can be improved.

The thermal insulation members 59 are formed with a material having low thermal conductivity compared to the piston main body 52a. By providing the thermal insulation members 59, the transfer of frictional heat generated by contact between the brake lining 7 and the disc 6 to the piston 52 can be suppressed.

Also, since a plurality of the thermal insulation members 59 abut the guide plate 8, the surface area in which a pressing force generated by deformation of the diaphragm 53 can be transferred increases, and the ability of the brake lining 7 to follow the deformation of the disc 6 caused by frictional heat or the like can be improved.

Figure 5A:
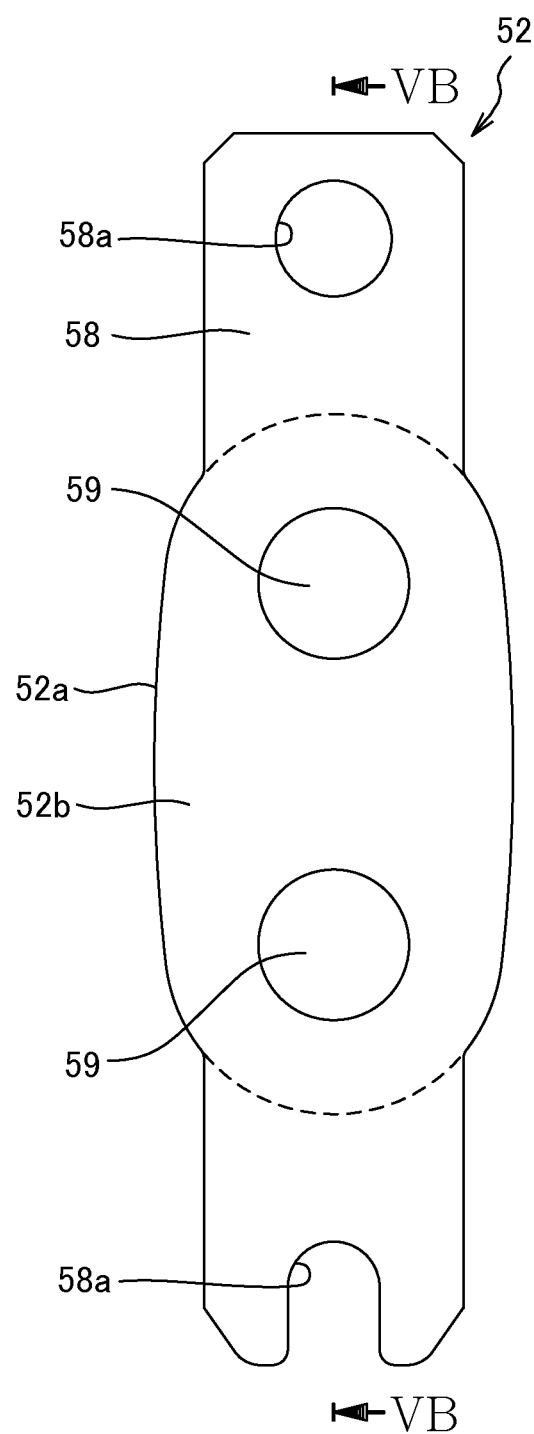
FIG. 5A is a front view of an alternative embodiment of the piston and the piston plate.
Figure 5B:
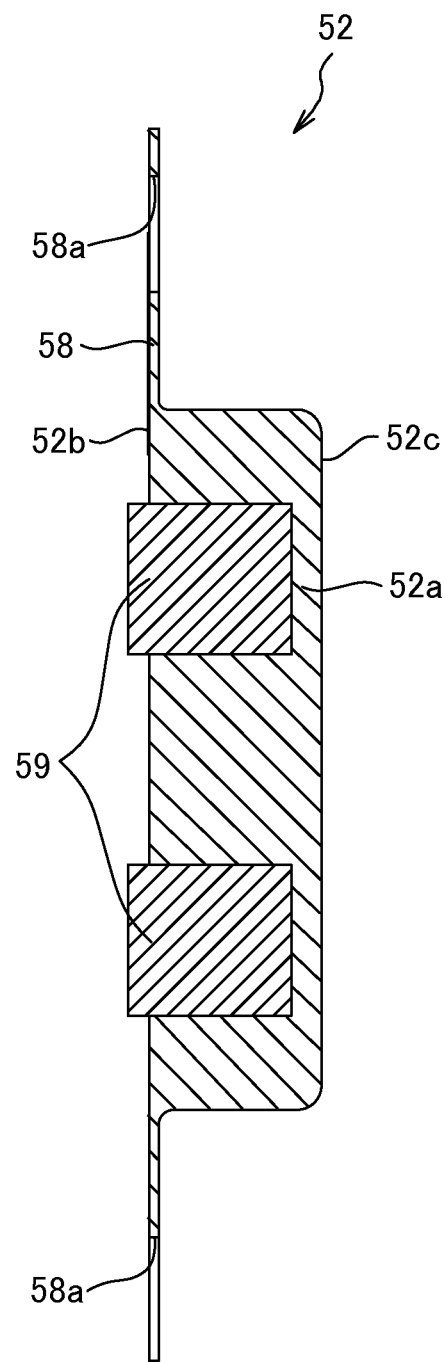
FIG. 5B is a cross-section view along line VB-VB in FIG. 5A.

As shown in FIGS. 5A and 5B, two thermal insulation members 59 having a large diameter can also be provided. In this way, any number of thermal insulation members 59 can be provided as long as the number is more than one.

As shown in FIG. 3, the piston plate 58 is a plate member provided in parallel to the guide plate 8. The piston plate 58 is provided such that its end surface is flush with the front surface 52b of the piston main body 52a.

The piston plate 58 displaces together with the piston 52 to move in parallel relative to the guide plate 8. The piston plate 58 approaches the guide plate 8 during braking, and separates from the guide plate 8 when releasing the braking. The piston plate 58 is formed integrally with the piston 52. However, the piston plate 58 can be formed separately from the piston 52, and the piston 52 can be used by fixing it to the piston plate 58.

The piston plate 58 includes a pair of sliding holes 58a into which the anchor pins 43 are inserted on both ends thereof in the lengthwise direction. The piston plate 58 is provided to engage with the anchor pins 43 which are inserted into the sliding holes 58a so that it can freely slide in the axial direction of the anchor pins 43. The piston plate 58 sets the position of the piston 52 within the cylinder 51 by the engagement of the sliding holes 58a on both ends thereof with the anchor pins 43.

The sliding hole 58a at the top side among the pair of sliding holes 58a is formed in a circular hole shape, and the other sliding hole 58a at the bottom side is formed in a notch shape. Thereby, the piston plate 58 can be attached to the caliper main body 10 by inserting one anchor pin 43 into the top-side sliding hole 58a, and then fitting the other anchor pin 43 from the bottom into the bottom-side sliding hole 58a. Therefore, the attachability of the piston plate 58 to the caliper main body 10 can be improved.

In a braking state in which the piston 52 presses the brake lining 7, a gap 57 is formed between the guide plate 8 and the piston plate 58. Due to the formation of this gap 57, frictional heat generated by contact between the brake lining 7 and the disc 6 is prevented from being directly transferred to the piston plate 58 from the guide plate 8.

Next, the action of the caliper brake apparatus 100 will be explained referring mainly to FIG. 3.

When the rail car is travelling, the wheel 5 rotates at high speed. Herein, when the caliper brake apparatus 100 is switched to a braking state by the operation of a driver or the like, compressed air supplied from an air pressure source is sent into the pressure chamber 55 via the through-hole 56 to deform the diaphragm 53. When the diaphragm 53 deforms, the bellows part 53b of the diaphragm 53 extends, and the pressing part 53c causes the piston 52 to slide in the direction of the disc 6.

The pressing part 53c of the diaphragm 53 displaces in the direction of the wheel 5, and presses the brake lining 7 against the disc 6 that is provided on the wheel 5 via the piston 52. When a frictional force is generated upon contact between the disc 6 and the brake lining 7 that is pressed by the diaphragm 53, the rotation of the wheel 5 is braked. Thereby, the speed of the rail car is decreased and the rail car eventually comes to a stop.

At this time, the piston 52 abuts the guide plate 8 via the thermal insulation members 59 whose distal ends protrude from the front surface 52b. Therefore, the transfer of frictional heat generated by contact between the brake lining 7 and the disc 6 to the piston 52, or in other words the transfer of such heat to the diaphragm 53, is suppressed.

Also, when the caliper brake apparatus 100 is switched to a braking state, thermal deformation of the disc 6 occurs due to the frictional heat between the disc 6 and the brake lining 7. However, since the piston 52 includes a plurality of thermal insulation members 59, the piston 52 can press against the brake lining 7 with a uniform pressing force following the thermal deformation of the disc 6. Thus, it is possible to achieve stable braking.

When braking of the wheel 5 by the caliper brake apparatus 100 is released by the operation of a driver or the like, the brake lining 7 separates from the state in which it was abutting the disc 6 due to the restoring force of the return springs 44 provided within the adjusters 40. Further, compressed air within the pressure chamber 55 is discharged from the through-hole 56, the bellows part 53b of the diaphragm 53 returns to the folded shape it was in before braking, and the pressing part 53c returns to the position it was in before braking. Thereby, the piston 52 also returns to the position it was in before braking.

Thereby, the disc 6 and the brake lining 7 are made to oppose each other again with a constant interval therebetween by the gap adjustment mechanisms 45. Therefore, the wheel 5 becomes able to rotate without any influence from the caliper brake apparatus 100.

At this time, the piston 52 is pulled farther away from the disc 6 due to inertial force along with the separation of the guide plate 8 from the disc 6 due to the restoring force of the return springs 44. Therefore, when the caliper brake apparatus 100 enters a non-braking state from a braking state, an air space can be formed between the guide plate 8 and the thermal insulation members 59, i.e. between the guide plate 8 and the piston 52. Thus, the thermal insulation of frictional heat generated by contact between the brake lining 7 and the disc 6 can be improved, and the diaphragm 53 can be protected from high heat.

Figure 6:
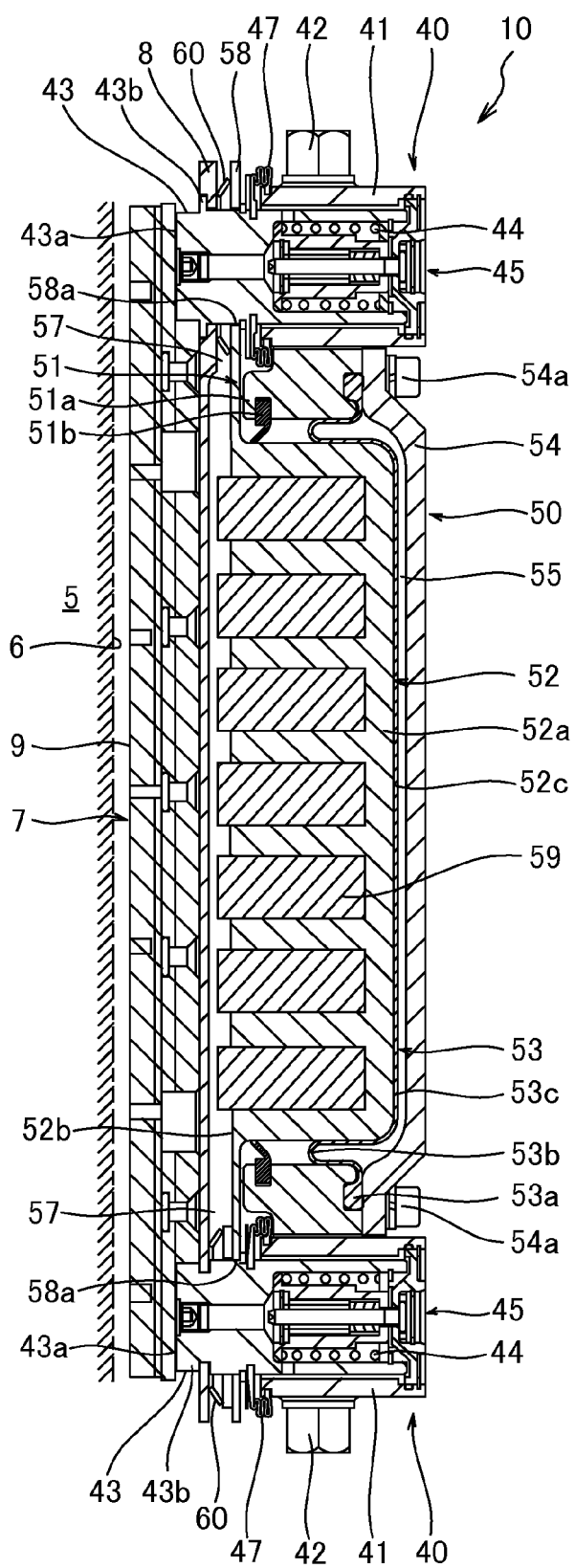
FIG. 6 is a cross-section view of a side surface of a caliper brake apparatus according to another alternative embodiment of the present invention.

As in the alternative embodiment shown in FIG. 6, disc springs 60 can be provided in the gap 57 between the guide plate 8 and the piston plate 58 as biasing members that bias the piston plate 58 so that it separates from the guide plate 8 when releasing the braking.

The disc springs 60 are formed in an annular shape corresponding to the outer peripheral shape of the anchor pins 43. The disc springs 60 are fitted to the outer periphery of the anchor pins 43 for use. Instead of the disc springs 60, coil springs or the like can also be used as the biasing members.

In this case, when releasing the braking of the caliper brake apparatus 100, the disc springs 60 force the piston plate 58 to separate from the guide plate 8 by the biasing force thereof. Thus, the air space formed between the guide plate 8 and the piston 52 can be enlarged. Accordingly, the thermal insulation of frictional heat generated by contact between the brake lining 7 and the disc 6 can be further improved.

The biasing force of the disc springs 60 is set to be smaller than the biasing force of the return springs 44. Therefore, at the start of braking in the caliper brake apparatus 100, first, the disc springs 60 are compressed and the thermal insulation members 59 of the piston 52 abut the guide plate 8. Subsequently, when the piston 52 strokes further, the return springs 44 are compressed and the brake lining 7 abuts the disc 6.

On the other hand, when releasing the braking of the caliper brake apparatus 100, first, the return springs 44 return to their length before the start of braking, and the brake lining 7 separates from the disc 6. Subsequently, the disc springs 60 return to their length before the start of braking, and the piston plate 58 is separated from the guide plate 8.

According to the above-described embodiments, the following effects are achieved.

The guide plate 8 that supports the brake lining 7 and the piston plate 58 that supports the piston 52 are formed separately. The guide plate 8 is supported by the anchor pins 43 to advance and retreat, and the piston plate 58 is supported by the anchor pins 43 such that it can freely slide. Therefore, when entering a non-braking state from a braking state, an air space can be formed between the guide plate 8 and the piston 52. Thus, the thermal insulation of frictional heat generated by contact between the brake lining 7 and the disc 6 can be improved, and the diaphragm 53 can be protected from high heat.

Further, when the caliper brake apparatus 100 is switched to a braking state, thermal deformation of the disc 6 occurs due to the frictional heat between the disc 6 and the brake lining 7. However, since the piston 52 includes a plurality of thermal insulation members 59, the piston 52 can press against the brake lining 7 with a uniform pressing force following the thermal deformation of the disc 6. Thus, it is possible to achieve stable braking.

Embodiments of this invention were described above, but the above embodiments are merely examples of applications of this invention, and the technical scope of this invention is not limited to the specific constitutions of the above embodiments.

This application claims priority based on Japanese Patent Application No. 2012-022693 filed with the Japan Patent Office on Feb. 6, 2012, the entire contents of which are incorporated into this specification.

The embodiments of this invention in which an exclusive property or privilege is claimed are defined as follows:

The invention claimed is:

1. A caliper brake apparatus that is configured to sandwich and to apply a frictional force to a disc, which is rotatable together with a wheel, the caliper brake apparatus comprising:
   a caliper main body that is supported on a vehicle body;
   a brake lining that is configured to advance/retreat relative to the caliper main body and to apply the frictional force by slidingly contacting the disc;
   a guide plate that supports the brake lining;
   an anchor pin that supports the guide plate on the caliper main body such that the guide plate is free to advance/retreat;
   a piston that is configured to advance/retreat relative to the caliper main body and to press against the brake lining via the guide plate;
   an elastic film that abuts a rear surface of the piston, defines a pressure chamber within the caliper main body and elastically deforms due to pressure of a working fluid within the pressure chamber so as to move the piston; and
   a piston plate that supports the piston on the anchor pin such that the piston is free to slide, the piston plate being separable from the guide plate,
   wherein the piston includes a plurality of small pistons provided such that their distal ends protrude toward the guide plate.

2. The caliper brake apparatus according to claim 1, wherein the piston has a piston main body that is supported on the piston plate, and a base part of each small piston is embedded and fixed in the piston main body.

3. The caliper brake apparatus according to claim 1, wherein the small pistons are thermal insulation members configured to suppress heat transfer from the brake lining to the elastic film.

4. The caliper brake apparatus according to claim 1, wherein the piston plate has a sliding hole into which the anchor pin is inserted, and the piston plate is configured to slide in an axial direction of the anchor pin to move parallel relative to the guide plate.

5. The caliper brake apparatus according to claim 4, wherein the anchor pin is provided as a pair of anchor pins so as to support both ends of the brake lining, and the sliding hole is provided as a pair of sliding holes on both ends of the piston plate, and the anchor pins are respectively inserted into the sliding holes.

6. The caliper brake apparatus according to claim 1, wherein the piston plate is formed integrally with the piston.

7. The caliper brake apparatus according to claim 1, wherein a gap is formed between the guide plate and the piston plate in a braking state in which the piston presses against the brake lining.

8. The caliper brake apparatus according to claim 1,
wherein the piston plate is configured to advance/retreat with respect to the anchor pin in an axial direction of the anchor pin.

9. The caliper brake apparatus according to claim 8,
wherein the piston plate is configured to move toward and away from the guide plate along the axial direction of the anchor pin.

10. A caliper brake apparatus that is configured to sandwich a disc which rotates together with a wheel to apply a frictional force thereto, comprising:
   a caliper main body that is supported on a vehicle body;
   a brake lining that is configured to advance/retreat relative to the caliper main body and can apply a frictional force by slidingly contacting the disc;
   a guide plate that supports the brake lining;
   an anchor pin that supports the guide plate on the caliper main body such that it can freely advance/retreat;
   a piston that is configured to advance/retreat relative to the caliper main body and can press against the brake lining via the guide plate;
   an elastic film that abuts a rear surface of the piston and defines a pressure chamber within the caliper main body and elastically deforms due to pressure of a working fluid within the pressure chamber so as to move the piston; and
   a piston plate that supports the piston on the anchor pin such that the piston can freely slide,
wherein
   the piston includes a plurality of small pistons provided such that their distal ends protrude toward the guide plate,
   a gap is formed between the guide plate and the piston plate in a braking state in which the piston presses against the brake lining, and
   a biasing member that biases the piston plate so that it separates from the guide plate when the braking is released is provided in the gap.

11. The caliper brake apparatus according to claim 10, further comprising:
   a return spring that pushes back the brake lining via the guide plate when the braking is released to separate the brake lining from the disc,
   wherein the biasing force of the biasing member is set to be smaller than the biasing force of the return spring.

12. The caliper brake apparatus according to claim 10,
wherein the biasing member is a disc spring that is formed in an annular shape corresponding to an outer peripheral shape of the anchor pin and fits on the outer periphery of the anchor pin.

* * * * *